Nov. 2, 1971  E. L. RADER  3,616,542
APPARATUS AND PROCESSES FOR PRODUCING FREEZE DRIED PRODUCTS
Filed Feb. 24, 1969  3 Sheets-Sheet 2

INVENTOR.
EARL L. RADER
BY William P. Green
ATTORNEY

INVENTOR.
EARL L. RADER
BY
William P. Green
ATTORNEY

3,616,542
APPARATUS AND PROCESSES FOR PRODUCING FREEZE DRIED PRODUCTS
Earl L. Rader, 154 W. Providencia,
Burbank, Calif. 91502
Filed Feb. 24, 1969, Ser. No. 801,383
Int. Cl. F26b 5/06
U.S. Cl. 34—5                                                43 Claims

ABSTRACT OF THE DISCLOSURE

Freeze drying equipment and methods in which a liquid is sprayed into a refrigerated chamber, maintained under a high vacuum, and is frozen into small preferably snow-like particles or flakes before the liquid can fall onto any surface in the chamber, following which the frozen particles fall downwardly onto a conveyor in the lower portion of the chamber, and are advanced slowly along the conveyor while heat is supplied to the particles in a manner subliming moisture from them.

BACKGROUND OF THE INVENTION

This invention relates to the production of freeze dried substances, such as coffee, tea, fruit juices, and other food products which are to be subsequently reconstituted at the time of use by the addition of water.

Various types of equipment have been proposed in the past for removing the moisture from a substance while it is in solid frozen form, in order to minimize the tendency for evaporation from the product of any of its volatile components other than water, so that the freeze dried product when ultimately remixed with or dissolved in water at the time of use will approximate as closely as possible the original liquid. Most of the prior freeze drying systems have been of the batch type, in which a pan or tray of the liquid is first frozen, and then gradually supplied with heat at a rate to slowly drive off the moisture while the product remains frozen. This type of system has been very slow and highly impractical for commercial production of freeze dried substances, and has produced a generally inferior product.

There have also been proposed certain continuous type freeze drying processes, in which the frozen product is advanced along a conveyor as heat is supplied to the product to drive moisture from it. However, none of these previously proposed continuous systems have to my knowledge proven sufficiently satisfactory for use on any wide scale in actual commercial production of a freeze dried product. One such prior continuous system is disclosed in U.S. Pat. No. 3,362,835 issued Jan. 9, 1968. In the arrangement of that patent, a liquid to be freeze dried is sprayed upwardly within a freezing chamber, and is frozen into the form of small particles in that chamber, with the particles being guided by a lower funnel portion of the chamber onto a conveyor, and then advanced by that conveyor along a drying path. Unfortunately, the apparatus of the patent is so designed that ice would obviously accumulate very rapidly in its interior and would require frequent complete shut-down of the equipment for removal of the ice. Also, it would appear that great convective turbulence would occur within the apparatus, by virtue of the positional relationships between the freezing and drying regions, and their refrigerating and heating elements, and the manner of communication between these regions, as well as the manner of withdrawal of gases from the system.

SUMMARY OF THE INVENTION

The present invention provides an improved continuous type of freeze drying apparatus and process, adapted to overcome the disadvantages of the above dsicussed and other prior continuous systems, and which can be operated at a relatively rapid rate of production of the ultimate freeze dried product, with no requirement for intermittent shut-down to remove accumulated ice, or for any other reason. The apparatus is preferably so constructed as to enable removal of all evaporated moisture from the equipment without interruption of the main freeze drying process, and without any substantial build-up of condensed moisture within the freeze drying regions themselves. For this purpose, I condense the evaporated moisture in a condensing chamber, which may be isolated from the main freezing and drying regions for removal of accumulated moisture from the condensing chamber while the overall drying process continues. Two such condensing chambers may be provided, so that one may be in use while moisture is being removed from the other, and vice versa.

In my apparatus, the liquid is sprayed into a freezing region, and frozen into small particles, in a relation and under conditions such that most of these particles (desirably all of them) fall downwardly directly onto a conveyor in frozen form, and without being permitted to first contact any other surface in the apparatus. I thus avoid any possibility of even gradual build-up of frozen material on a surface such as the lower funnel or chute portion of the freezing chamber in the above discussed U.S. Pat. No. 3,362,835. The conveyor then advances the particles generaly horizontally through a sublimation region and toward a discharge end of the apparatus, with heat being supplied to the particles as they move slowly along the conveyor, to thereby sublimate moisture from the particles while they remain frozen. The conveyor desirably vibrates, in order to periodically bounce the particles upwardly away from the conveyor surface, to thereby continuously expose a maximum amount of the surface area of the particles, and attain maximum freedom for evaporation of liquid from all of the particle surfaces.

The temperature in the freezing region is desirably maintained low enough to cause bursting of the minute droplets of liquid into very loosely packed, snow-like form, so that the individual particles have large pores or cavities extending into their interior, and have extremely large surface areas as compared with the amount of material actually present in each of the flakes. This large surface area condition facilitates rapid and complete sublimation of moisture from the individual particles, as they move along the conveyor. To assure formation of such snow flakes in the sprayed portion of the chamber, this region is refrigerated, desirably by providing refrigerant in the walls of the chamber, and the liquid is sprayed downwardly within the apparatus rather than upwardly as in U.S. Pat. No. 3,362,835. Also, the portion of the chamber within which the spray is directed downwardly may flare progressively as it advances downwardly, in essential correspondence with the flaring pattern of the spray, to avoid impingement of any of the liquid on the chamber side wall surfaces. For best results, the spray nozzle introduces liquid into the chamber in a spray pattern which changes repeatedly, to avoid development of an unchanging pattern along which droplets and particles from a continuous spray might otherwise tend to fall. This changing spray pattern may most easily be attained by merely increasing and decreasing the spraying pressure, to produce a pulsating spray.

To prevent the development of turbulent gas and vapor movement conditions in the apparatus, I provide a unique shield structure between the freezing and drying regions, and withdraw the evaporated moisture at least partially from the drying region. Various other features of novelty are also incorporated in the apparatus, and will be discussed in detail below, to attain an optimum, continuous and rapid production of freeze dried material.

BRIEF DESCRIPTION OF THE DRAWINGS

The above and other features and objects of the invention will be better understood from the following detailed description of the typical embodiment illustrated in the accompanying drawings in which.

DESCRIPTION OF THE PREFERRED EMBODIMENT

Figure 1:
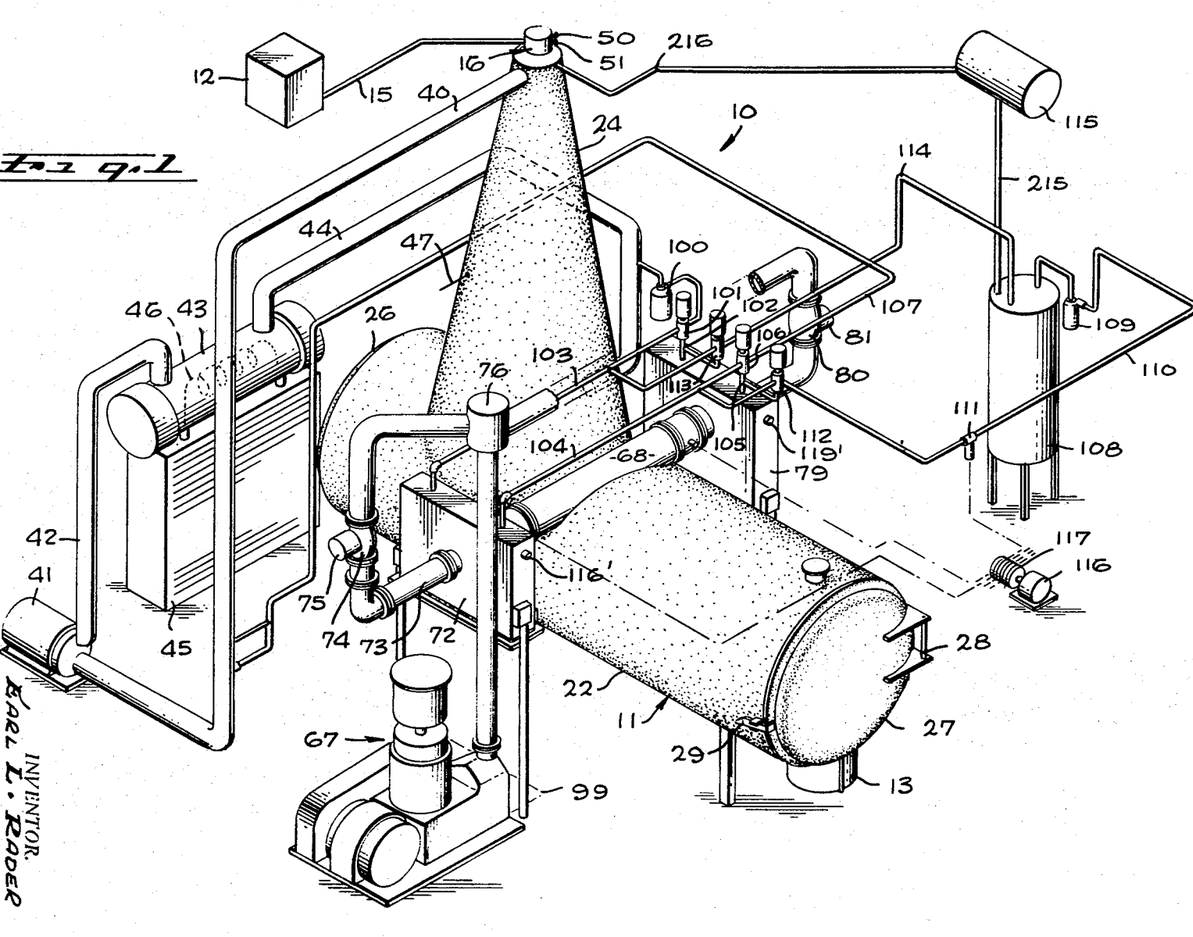
FIG. 1 is a somewhat diagrammatic perspective representation of a freeze drying system constructed in accordance with the invention.

Referring first to FIG. 1, I have illustrated generally in that figure a freeze drying system 10 which includes a main sealed fluid tight shell or housing 11 within which a liquid from a supply container 12 is a freeze dried, for ultimate delivery in its freeze dried condition into a receptacle 13 through an outlet 14 located at one end of the shell 11. The liquid within container 12 may be coffee, tea, any desired fruit juice, or any other food or beverage which can be supplied in the form of a solution or suspension in water. This liquid is taken from container 12 through a line 15, and is injected into the upper end of shell 11 in spray form by a regulatable injection pump 16.

Figures 2, 3, 4:
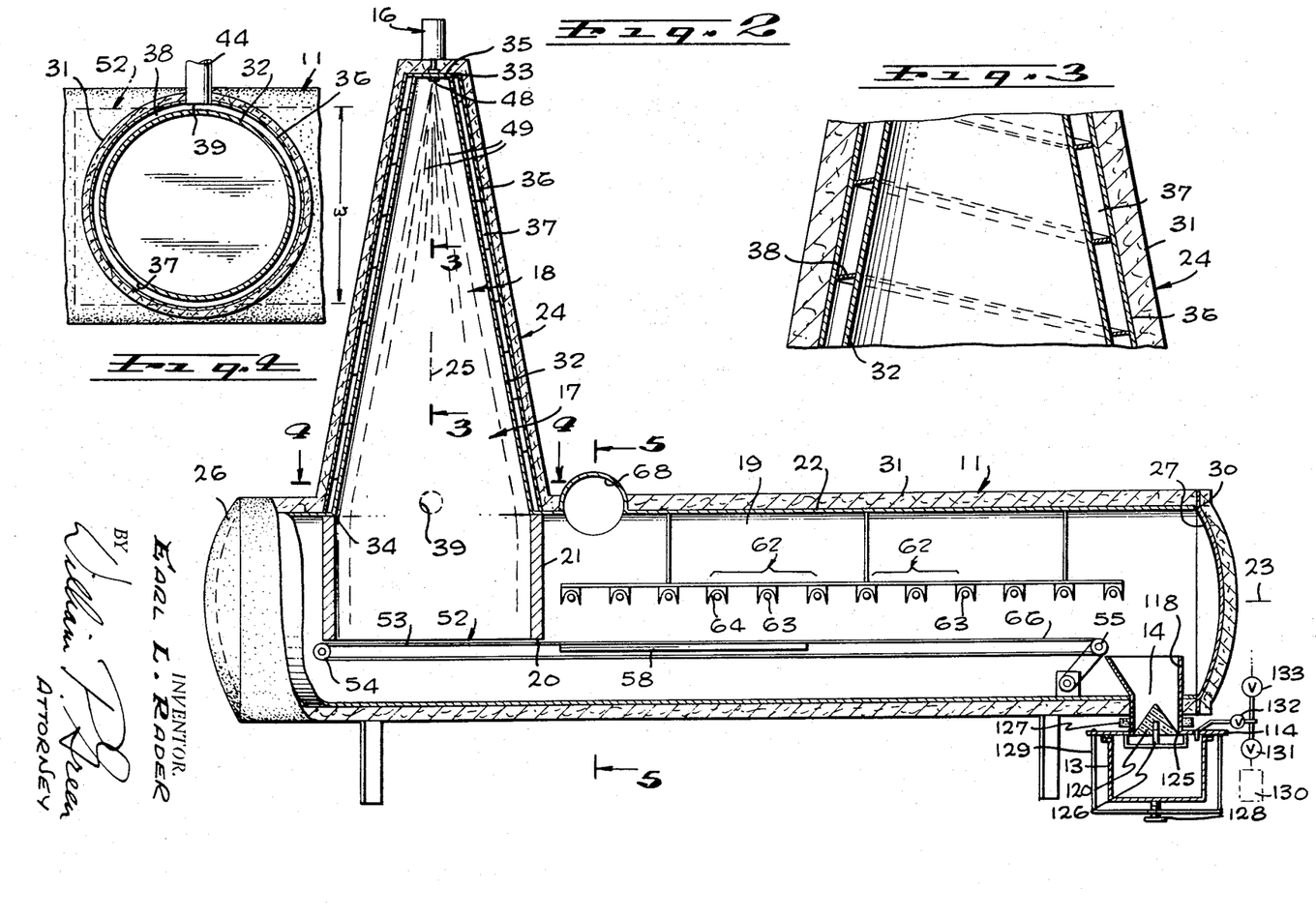
FIG. 2 is a central vertical section through the main vacuum chamber of the system.
FIG. 3 is a fragmentary enlarged vertical section taken on line 3—3 of FIG. 2.
FIG. 4 is a horizontal section taken on line 4—4 of FIG. 2.

The main shell 11 contains and defines what may be considered as a single closed vacuum chamber 17, which may be separated into a freezing region or compartment 18 and a sublimation region or compartment 19, with communication being maintained between these two regions or compartments past the lower edge 20 of a partition or shield structure 21. To define this two region structure, shell 11 is formed primarily of a main horizontally extending rigid cylinder 22 centered about a horizontal axis 23, and a connected upwardly projecting vertical column 24 disposed about a vertical axis 25 which intersects horizontal axis 23. Both of the structures 22 and 24 are formed of a suitable rigid material capable of withstanding the differential pressures encountered in use, with a suitable stainless steel being preferred for the purpose. The opposite ends of cylinder 22 are closed by two transverse circular end doors 26 and 27 (FIG. 2), each of which is hinged to side wall 22 by hinges such as those represented at 28 in FIG. 1, for horizontal swinging movement to open positions providing access into the interior of the shell. Each of the doors is adapted to be retained in closed position by a suitable latch mechanism as represented at 29, and is peripherally sealed in fluid tight relation with respect to cylinder 22 by a suitable annular gasket 30 (FIG. 2). An appropriate heat insulative material 31 extends entirely about the shell, including its horizontal portion 22, upwardly projecting portion 24, and end doors 26 and 27, to effectively insulate the interior of the shell against transmission of heat thereinto from the outside of the shell.

The upwardly projecting portion 24 of the shell has a side wall 32 which desirably has a relatively small horizontal cross-section at its upper edge 33, and flares progressively as it advances downwardly to its line of connection 34 (FIG. 1) with horizontal cylinder 22. For best results, this wall is at all points of circular horizontal section, and flares at a uniform rate, to thus take the form of a cone, centered about vertical axis 25. At its upper end, the conical portion 24 may be closed by a top horizontal wall 35.

To refrigerate the region or compartment 18 within upwardly projecting portion 24 of the shell, there is provided about portion 24 a second rigid preferably stainless steel conical wall 36, defining between walls 32 and 36 a conical space 37 through which a low temperature refrigerant liquid is pumped. This cooling jacket space 37 is of course closed at all points except at the locations at which the coolant liquid is pumped into and out of the space, and for best results is partitioned interiorly by an upwardly spiraling divider 38 into a circuitous coolant flow path, within which the coolant is required to spiral about axis 25 at it advances upwardly from an inlet opening 39 (FIG. 2) to a discharge line 40 (FIG. 1).

The refrigerant liquid, which may be any suitable non-corrosive heat transfer fluid, such as a diethylene glycol base coolant, is forced into the lower end of the spiral refrigerant passage 37 by a circulation pump 41 (FIG. 1), whose discharge line 42 first directs the coolant through a heat exchanger 43, from which the cooled fluid flows through a heat insulated line 44 which connects into the lower end of spiral passage 37 through the mentioned inlet opening 39. Within heat exchanger 43, the refregerant fluid is cooled by transfer of heat therefrom to a primary fluid which is cooled by a conventional refrigerating system 45. For example, the primary refrigerant from system 45 may typically be conducted through coils 36 within heat exchanger 43, in isolation from but in heat transferring relation with respect to the secondary refrigerant fluid which is flowing through the heat exchanger shell 43 from line 42 to line 44. Refrigerating system 45 is controlled thermostatically to maintain a predetermined optimum temperature wtihin the interior of the upper conical portion 24 of the main shell 11, and for this purpose may have a thermostatic probe projecting into the interior of the conical shell at 47, and appropriately connected to the refrigerating system 45 to turn it on and off as necessary to maintain the desired internal temperature in the cone.

The liquid to be freeze dried is sprayed into the interior of the conical portion 24 of shell 11 through a conventional spray nozzle 48, which atomizes the liquid into a finely divided mist of very tiny droplets, aimed downwardly in a conical spray pattern 49, whose periphery (at maximum liquid pressure) flares downwardly substantially parallel to but spaced inwardly from conical side wall 32 of the shell. Thus, the downwardly flaring conical spray pattern does not direct any liquid onto side wall 32 of the shell, and in fact prevents contact of any of the liquid with that side wall to thus prevent accumulation of any moisture or ice thereon.

The liquid is forced through and from spray nozzle 48 by the previously mentioned injection pump 16. This pump may be of a type capable of forcing the liquid at a regulatable constant pressure through nozzle 48, or may be, and preferably is, of a character producing a pulsating pressure which alternately increases and decreases at regular timed intervals, to produce a pulsating spray pattern which alternately expands to an increased horizontal size and collapses to a reduced horizontal size (or complete shut-off). In its condition of maximum size, the periphery of the spray pattern desirably has the previously mentioned relation of parallelism with respect to the side wall 32 of the shell.

The repeated and preferably continual change in spray pattern avoids anyt endency for the sprayed droplets to follow unchanging paths downwardly through the chamber, in a manner which might cause development of temperature variations between different locations in the refrigeration compartment. Pump 16 may be adjustable, as by two adjusting knobs represented at 50 and 51 in FIG. 1, in order to controllably vary or preset both the frequency of the pressure pulsations, and the overall quantity of liquid emitted upon each pulsation cycle. Pumps which are capable of this type of operation and regulation are well known in the art, and therefore no attempt has been made to complicate the present disclosure by illustrating the interior construction of the pump. As an example, the pump may typically be of a plunger type, having an injection plunger which is operated intermittently in a pumping stroke by a suitable camming mechanism or the like, with the rate of rotation of the cam and the pumping stroke of the plunger both being adjustable.

The interior of shell 11, including both of the regions or compartments 18 and 19, is maintained at a very low sub-atmospheric pressure, that is, at a very high vacuum, the pressure desirably being not greater than about 225 microns, and for best practical results as low as about 175 microns. When the highly atomized sprayed liquid is introduced into the upper portion of the conical freezing chamber 18, the evaporative cooling effect produced by evaporation of some of the moisture from the sprayed liquid tends to cool the sprayed droplets toward freezing temperature. The additional cooling effect attained by the refriegerant fluid within spiral passage 37 supplements the effect of the evaporative cooling, and causes the sprayed droplets to freeze very rapidly from liquid form to solid form, as they advance downwardly within freezing compartment 18. The temperature within that compartment is maintained sufficiently below freezing (desirably at least as low as about −30° F., and for best results, between about −40° F. and −50° F.) to assure a rapid enough freezing action to cause conversion of the minute droplets of liquid into a very low density snowflake form, in which there are large voids or pores extending into each snowflake, with the flake having projections extending out in different directions to provide a very large surface area on each flake. Each of the sprayed droplets is converted into the form of such a frozen particle as the droplet moves downwardly within the freezing chamber 18, and before the droplet is able to contact any surface in the interior of shell 11. More specifically, the sprayed material is all in solid particulate form before the frozen particles reach and fall onto the upper surface of a conveyor belt 52 which extends across the underside of the freezing chamber. These particles, because of their frozen condition, do not tend to adhere to or freeze onto the upper surface of the conveyor, but instead are carried loosely and individually on the surface of that conveyor as the latter advances rightwardly within sublimation compartment 19 of FIG. 2.

Conveyor 52 may take the form of an endless belt, of a width (FIG. 4) great enough to extend entirely across and essentially close the underside of the freezing compartment 18, as defined by the previously mentioned lower edge 20 of shield or partition 21. This shield is preferably in the form of a vertical cylinder centered about axis 25, and connected at its upper circular end to conical side wall 32, and formed of a desirably transparent heat insulative material, such as methyl methacrylate, capable of preventing the transfer of substantial heat between compartments 18 and 19. The liquid spray pattern is preferably such that, by the time the fallen frozen particles reach the upper edge of shield 21, the particles are falling directly downwardly and are not flaring outwardly. Consequently, the side wall of the shield need not flare, but may extend directly vertically as shown, and even though vertical will not be contacted by the falling particles.

Conveyor belt 52 may be mounted by two rollers 54 and and 55, at least one of which is driven at a very slow rate to continuously advance an upper horizontal run 53 of the endless belt rightwardly as viewed in FIG. 2, to thus gradually move the frozen particles from the freezing compartment 18 past the lower edge of partition 21 into the sublimation chamber 19. Lower edge 20 of partition 21 is circular about axis 25, and is spaced above upper run 53 of the conveyor belt a very short distance, just sufficient to clear the upper portions of, and avoid contact with, the frozen particles or flakes 56 on the belt.

Suitable means may be provided for vibrating upper run 53 of the belt slightly as it and the carried frozen particles 56 are advanced rightwardly in FIG. 2. For this purpose, I may utilize a grid structure 57 extending along the underside of upper run 53 of the belt, and adapted to be vibrated vertically through a very short range of movement by a vibrator mechanism represented diagrammatically at 58. This vibrator mechanism is appropriately energized, as by electricity, compressed air, or the like. The grid 57 may include a series of parallel typically stainless steel elongated rods 59 (FIG. 5) extending longitudinally along the underside of upper run 53 of the endless belt, and suitably connected together and to the vibrator 58 for actuation thereby. Along the opposite side edges 60 of the upper run of the belt, two of these longitudinally extending elements 59 may have upturned flange portions 61 forming retainers for preventing lateral loss of any of the frozen particles from the sides of the belt.

As the frozen particles 56 are advanced rightwardly in FIG. 2 by conveyor belt 52, radiant heat is supplied gradually to these particles at a rate and temperature causing the moisture in the particles to sublime, that is to convert directly from solid form to vapor form without passing through liquid form, and all while the particles themselves remain continuously in solid frozen form. This heat is desirably supplied by a series of banks 62 of quartz tube-type infrared lamps 63, with each bank 62 typically including three such lamps, and with the lamps disposed parallel to one another and extending transversely with respect to the direction of advancement of the conveyor belt. The quartz lamps are connected to an appropriate source of electrical energy, with the voltage supplied to the different lamps being regulatable to controllably determine the rate of heat radiation. Preferably, the temperatures of different ones of the lamps, or different banks of lamps, are regulatable separately, as by separate controls represented diagrammatically at 162 in FIG. 5, so that the rate of radiation of heat downwardly from the tubes onto the frozen particles may be regulated at different locations along the path of movement of the particles in order to attain any desired subliming effect. The quartz tubes may be contained within appropriate typically semi-cylindrical reflector structures 64 (FIG. 5) acting to direct the radiation primarily downwardly, and may be supported in fixed position within the cylindrical portion 32 of shell 11 in any suitable manner, as by supports represented at 65 in FIG. 5. The temperatures of the different infrared lamps are controlled to sublime the moisture from the particles completely before arrival of the particles at the discharge end 66 of the conveyor belt, and desirably with the completely dried particles arriving at that discharge end at approximately ambient temperature, typically about 70 degrees Fahrenheit.

The extremely low sub-atmospheric pressure, or high vacuum, is maintained within chamber 17, including both of its communicating regions or compartments 18 and 19, by a continuously operating vacuum pump 67 (FIG. 1). This pump takes suction from the upper portion of cylinder 22 along two alternate paths, leading from the opposite ends of a horizontally extending cylindrical pipe 68 which is connected essentially transversely and essentially tangentially into the upper side of cylinder 22. As will be apparent from FIGS. 1 and 5, this pipe 68 is cut away at its underside, to provide an opening communicating with a registering opening in the upper surface of cylinder 22, with the two parts being peripherally welded or otherwise secured together in this tangential and sealed relationship. To assist in minimizing atmospheric turbulence within the apparatus, pipe 68 is preferably connected into cylinder 22 at a location directly adjacent and to the right of shield or partition 21.

Figure 5:
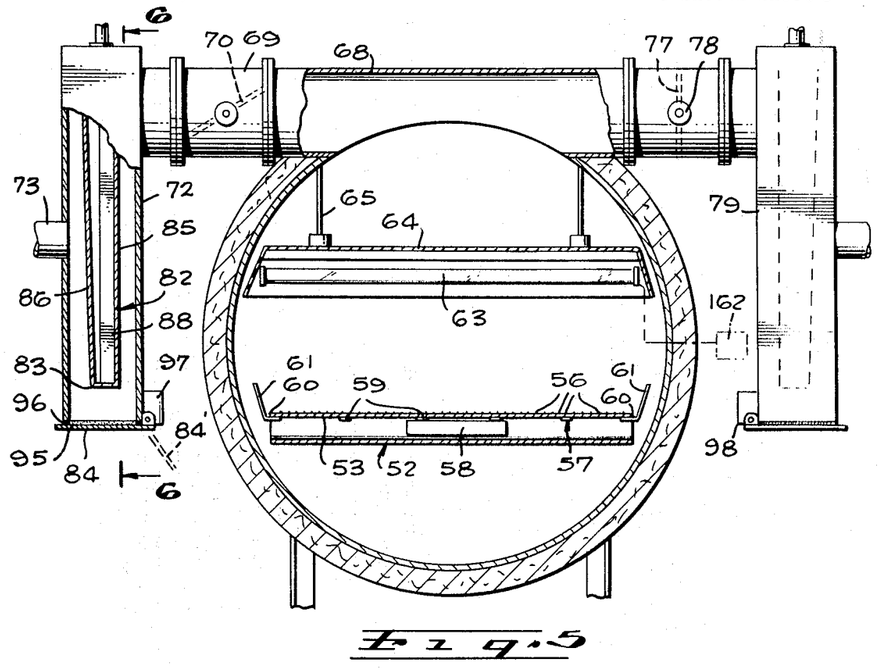
FIG. 5 is an enlarged vertical section the central portion of which is taken essentially on line 5—5 of FIG. 4, but with certain other portions being shown in elevation.

From the left end of pipe 68 in FIG. 5, the moist gases withdrawn from compartment 19 pass first through a tubular valve body 69 containing a butterfly valve 70 which is power actuable between an open position and a fully closed position. When this valve is opened, the withdrawn moist gases flow leftwardly into the interior of a moisture removal chamber 72, within which the moisture in the gases is removed by freezing, with the dried gases then being pumped by vacuum pump 67 from chamber 72 through a line 73 and a valve 74 which is power actuable by an electric motor 75 to a header 76 from which the vacuum pump takes suction. An identical alternate gas exhaust path is provided at the opposite side of the cylinder 22, past a second butterfly valve 77, actuable by a motor 78, then through a second moisture removal chamber 79 and a valve 80 controlled by a motor 81, to the mentioned header 76.

Figure 6:
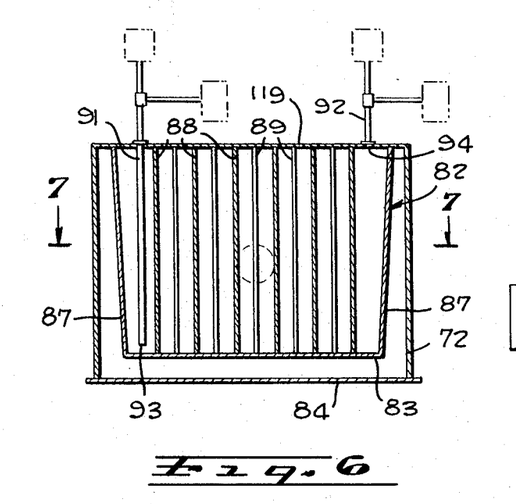
FIG. 6 is a vertical section taken on line 6—6 of FIG. 5.
Figure 7:
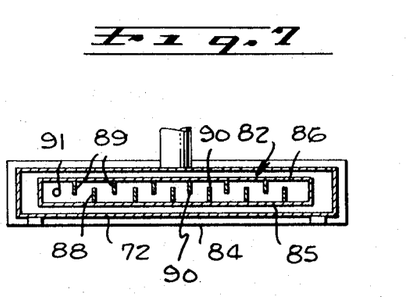
FIG. 7 is a horizontal section taken on line 7—7 of FIG. 6.

Within each of the moisture removal chambers 72 and 79, there is provided a hollow freezing structure 82 (FIGS. 5, 6 and 7), through which some of the refrigerating fluid from line 44 is passed to reduce the temperature of structure 82 to a value low enough to freeze the moisture from the exhausted gases onto the outer surface of each structure 82. The structure 82 is shaped to extend substantially vertically, and to taper downwardly toward a reduced horizontal dimension bottom wall 83, so that a block of ice accumulated about each of the structures 82 can fall downwardly from about that structure and out of the bottom of the moisture removal chamber 72 or 79, past a bottom door 84, when a heated fluid instead of a cool fluid is introduced into the interior of structure 82. To define the tapered configuration of structure 82 more specifically, reference is first made to the left portion of FIG. 5 in which the structure 82 is illustrated as having two generally parallel and generally vertical walls 85 and 86 which converge toward one another as they advance downwardly, with the first wall 85 typically being directly verticaly, and the second wall 86 advancing at an inclination toward wall 85 as wall 86 extends downwardly. Similarly, as viewed in FIG. 6, structure 82 may have two opposite generally vertical end walls 87 which converge toward one another as they advance downwardly toward bottom wall 83. Interiorly, the structure 82 may be strengthened by provision of a first series of vertical parallel baffles 88 welded to and projecting from side wall 85, and a second series of intermediate parallel vertical baffles 89 welded to and projecting from wall 86 (FIGS. 5, 6 and 7), with the partitions of both of these series having edges 90 spaced from the walls to which they are not secured, to provide a very circuitous path (FIG. 7) along which refrigerant fluid must flow in passing from inlet tube 91 to outlet tube 92. The inlet tube may project downwardly to a location 93 near the bottom of structure 82, while outlet tube 92 may withdraw the coolant from a location 94 at the top of structure 82.

The two moisture removal chambers 72 and 79 may be shaped essentially rectangularly to extend about their contained structures 82, in spaced relation thereto, and with each of the chambers 72 and 79 having a bottom horizontal rectangular outlet opening 95 closed by the associated door 84. Door 84, when closed, is sealed peripherally with respect to the bottom outlet opening of the associated chamber 72 or 79 by a suitable rectangular rubber seal element 96. The doors are actuable electrically or by other power from their illustrated closed positions to their downwardly swung open positions, such as the broken line position illustrated at 84' in FIG. 5. As an example, I have typically illustrated electric motors 97 and 98 for thus opening and closing doors 84. Receptacles or trays 99 may be provided beneath chambers 72 and 79, for receiving the ice blocks which fall downwardly from about structures 82 upon partial melting thereof, with trays 99 being spaced beneath the lowermost positions of the doors a distance at least as great as the vertical height of chambers 72 and 79, to thereby support the ice blocks without interfering with immediate reclosure of the doors 84, if desired.

The coolant fluid from line 44 is pumped into the two condensing structures 82 selectively by a motor driven pump 100 (FIG. 1), which forces the fluid past an electrically operated three-way valve 101, which selectively passes the refrigerant fluid through either a line 102 leading to the inlet tube 91 of chamber 79, or a line 103 leading to the inlet tube 91 of the second chamber 72. similarly, the coolant discharge tubes 92 of the two chambers 72 and 79 flow through lines 104 and 105 of FIG. 1 past an electrically operated three-way discharge control valve 106 and into a line 107 leading into coolant return line 40 flowing to pump 41.

For heating the interiors of the two structures 82 selectively, I provide a heater 108 (FIG. 1), which may be similar to a conventional hot water heater, and which heats secondary refrigerant or coolant of the same type that flows through passage 37 in portion 24 of shell 11. This heated liquid is taken by an electrically driven pump 109 discharging through a line 110 and past on electrically operated solenoid valve 111 to an electrically operated three-way valve 112. Valve 112 is operable to selectively pass the heated fluid to lines 104 and 105 connecting with tubes 92 of the two chambers 72 and 79, to introduce heated fluid into structures 82 through the tubes which are normally the cold refrigerant discharge lines. The heated fluid leaves the two structures 82 through lines 102 and 103, which connect into an electrically operated three-way selector valve 113, from which the fluid passes through a return line 114 back to heater 108. The entire fluid system may be maintained full at all times by provision of a gravity replenishing tank 115, located above the heater and above all other portions of the refrigerant system, including specifically the highest portion of passage 37 in FIG. 2, to deliver make-up fluid to the system as needed, by gravity, through a line 215 leading into the top of that heater and a line 216 leading into the top of passage 37.

The various electrically operated control valves, motors, etc. are all actuated in predetermined timed relation by a suitable timing mechanism, typically illustrated as including an electric timer motor 116, having a series of cam actuated switches 117 for controlling the various electrically actuated units in timed relation.

The ultimate freeze dried product which discharges from the right end of conveyor belt 52 may be directed into the previously mentioned accumulation receptacle 13 (FIGS. 1 and 2) through a suitable downwardly converging chute 118, directing the freeze dried particles, by gravity, out through a tubular outlet fitting 14, and past a valve 120 which is normally open to pass the particles into receptacle 13. Valve 120 may take the form of a conical element engageable upwardly against an annular seat 125 formed at the bottom of outlet fitting 14. Element 120 may be formed of iron or other magnetic metal and be guided for only vertical movement by reception of a guide rod 126 within a vertical central guideway in element 125, with rod 126 being mounted by a spider 127. An annular electromagnet 127 about the outside of fitting 14 acts when energized to draw element 120 upwardly to its closed position, to thereby enable removal of container 13 without breaking the vacuum within chamber 17. The container is removed by merely loosening a clamping screw 128 on a retaining bail 129, whose ends are pivoted to a lower flange 114 on fitting 14 to enable the bail and carried clamping screw to be swung away from beneath the container 13. An appropriate seal ring may be provided between flange 114 and container 13, to form a fluid tight seal therebetween.

To now describe a complete cycle of operation of the illustrated apparatus, assume that the refrigerating and heating units have all been brought to their proper operating temperatures, and that the desired high vacuum condition has been developed by pump 67 within freezing region 18 and sublimation or drying region 19 of the compartment 17. Also, assume that butterfly valve 70 of FIG.

5 is open, and the related valve 74 at the outer side of chamber 72 is also open, while the corresponding valves 78 and 80 associated with the second moisture removal chamber 79 are closed, and with the door 84 of chamber 72 closed. In this condition, vacuum pump 67 withdraws moist air from within chamber 17 through moisture removal chamber 72, to cause freezing of the moisture on the outside of the structure 82 within chamber 72 until a substantial block of ice is formed about that structure 82. For this freezing purpose, the three-way valves 101 and 106 are in a condition in which they pass cold refrigerant from pump 100 into and out of the structure 82 within chamber 72, but close off the flow of any cold refrigerant into or out of structure 82 within the second moisture removal compartment 79. Also, it may be assumed in the starting condition of the apparatus that all ice which had accumulated in the second compartment 79 on the previous cycle of operation has already been removed past door 84, and that the door has returned to closed position, with heated fluid pump 109 stopped and valve 111 closed, and with vacuum valve 78 closed and valve 80 open.

With the apparatus in this described condition, pump 16 of FIG. 2 acts to inject a pulsating flow of atomized liquid into the upper portion of chamber 18, in the downwardly flaring spray pattern previously discussed and illustrated at FIG. 2, with rapid conversion of the sprayed tiny droplets into the form of frozen particles, and desirably snowflake type particles which then fall or drift downwardly within chamber 18 and onto the left end portion of upper run 53 of conveyor belt 52. The conveyor belt then advances the falling particles continuously rightwardly beneath the infrared lamps 63, which supply enough heat to gradually sublime all moisture from the particles to vapor form, without converting that moisture to or through liquid form. The particles are thus gradually dried while in frozen form, to ultimately arrive at the right end of the conveyor in completely dried form, for discharge into receptacle 13.

The water vapor which enters the atmosphere within sublimation chamber 19 of FIG. 2 is drawn by vacuum pump 67 through chamber 72, within which the moisture is frozen onto the outer surfaces of structure 82, so that the dried gases from the sublimation chamber may then pass through line 73 for discharge to the atmosphere from the pump 67. After a sufficient predetermined timed interval has elapsed to allow for the accumulation of a predetermined quantity of ice on the outer surface of structure 82 of compartment 72, timer 116, which turns continuously, acts through one of its switches 117 to shift the refrigerant controlling three-way valves 101 and 106 to reversed conditions, to direct the cold refrigerant from pump 100 into chamber 79 instead of chamber 72, and return the refrigerant from chamber 79 rather than chamber 72, so that the structure 82 within chamber 79 is gradually refrigerated, while the ice on structure 82 within chamber 72 of course remains cool enough to continue to condense moisture from the moist gases even after its refrigerant is shut off.

After the three-way valves 101 and 106 have been reversed, and after the flow of cold refrigerant liquid to the structure 82 within chamber 79 has continued for a long enough period to assure reduction of the temperature of that structure 82 to a predetermined operating temperature, low enough to effectively freeze substantially all moisture which passes through chamber 79, timer 116 opens butterfly valve 77 of FIG. 5, so that moist gases from within the main sublimation chamber may commence to be withdrawn past that butterfly valve and through chamber 79. After such opening of butterfly valve 77, both of the gas flow control valves 70 and 74 at the opposite side of shell 11 are closed simultaneously by timer motor 116, so that thereafter the moist gases from within shell 11 can now only discharge through chamber 79, to commence the accumulation of ice in that chamber.

Next, the timer opens solenoid valve 111, and starts pump 109, to commence the flow of heated fluid from heater 108 through three-way valve 112 and line 104 into the interior of the structure 82 within chamber 72, to partially melt melt the ice which has accumulated about structure 82, with the heated fluid discharging from that structure through line 103 and the three-way valve 113 and line 114 back to the heater. Valves 112 and 113 may already be in proper positions to thus direct the heated fluid through chamber 72 and not chamber 79. After the heated fluid has passed through structure 82 within chamber 72 for a short period of time, the ice about the tapered structure 82 will have melted slightly at the location adjacent the walls of structure 82, and will fall downwardly from that structure. At approximately the time that this ice falls, timer 116 momentarily opens an electrical vent valve 116' (FIG. 1) to release the vacuum within chamber 72, and then actuates motor 97 (FIG. 5) to open door 84 at the bottom of chamber 72, so that the ice block may fall downwardly past the door and to a position on tray 99, in which position the upper portion of the block will be low enough to clear door 84 even when the latter is swung between its open and closed settings. In connection with the release of the ice from about structure 82, it is noticed that the upper ends of all of the previously discussed walls 85, 86 and 87 of structure 82 preferably connect directly to the top horizontal wall 119 of chamber 72, so that structure 82 has no upper surface on which ice can accumulate within chamber 72, and therefore the accumulated block of ice can only be formed on the side walls and bottom wall of structure 82, and will therefore fall downwardly very freely from about that structure when only slightly melted.

As soon as a predetermined time interval has expired long enough to assure sufficient melting for the ice to drop out of chamber 72, timer 116 closes door 84 of chamber 72, stops pump 109 and closes solenoid valve 111, and then opens vacuum valve 74 to commence a reduction of the pressure in chamber 72. The hot fluid three-way valves 112 and 113 may also be reversed at this time by the timer to be in a position for passing heated fluid to and from chamber 79, through the fluid is not at this time actually delivered to the three-way valves.

After the apparatus has been in this condition for a period sufficient to enable accumulation of a predetermined quantity of ice on chamber 79, and assuming that the pressure in chamber 79 has already been reduced to a vacuum condition corresponding to that in the sublimation chamber 19 itself, the refrigerant controlling three-way valves 101 and 106 are reversed back to their original condition by the timer, to again deliver cold refrigerant into chamber 72 rather than chamber 79. When the temperature of the structure 82 within chamber 72 has then reached a predetermined moisture freezing normal operating temperature for that structure, butterfly valve 70 is opened by the timer to commence flow of the moist gases through moisture removal structure 72, and the two gas flow controlling valves 77 and 80 at the opposite side of shell 11 are then closed to terminate the flow of moist gases through chamber 79. Next, the timer 116 opens solenoid valve 111, and commences operation of pump 109, to force heated fluid into the structure 82 within chamber 79, and subsequently opens an atmospheric vent valve 119' on chamber 79, and the bottom door of that chamber, when approximately the right interval has expired for the ice to melt sufficiently to drop onto tray 99. After the door has remained in open condition long enough to assure dropping of the ice onto the tray, the door is closed by the timer, and valve 80 is opened to commence the development of a vacuum in chamber 79; and the apparatus has then returned to the condition which was assumed to be the initial starting condition in the present description. Thus, a complete cycle of operation has been concluded, and the same cycle is then of course reepated after enough time has elapsed to accumulate a block of ice within chamber 72.

The partition 21 of FIG. 2 acts to prevent the transmission of excessive heat between sublimation chamber 19 and freezing chamber 18, and also serves to prevent the development of turbulence within the interior of shell 11 as a result of convective air or vapor currents which may tend to be produced by the different temperature conditions prevailing in shell 11. For instance, partition 21 blocks off any substantial convective flow of heated vapors or gases within chamber 19 upwardly into the upwardly projecting freezing chamber 18, and prevents excessive downflow of the cold air within freezing chamber 18 toward the lower sublimation chamber 19. To attain this effect, it is desirable that the communication gap which places chambers 18 and 19 in communication with one another, at the lower edge of partition 21, be as small as is possible, while still enabling free and unrestrained movement of the particles 56 between these chambers on conveyor 52, and while still enabling some actual communication between the atmospheres in the two chambers with maintenance of the same high vacuum conditions in both chambers. For best results, the gap beneath the conveyor and the lower edge of partition 21 should desirably be very small as compared with the dimensions of the two chambers 18 and 19 which the gap connects. Stated differently, the maximum horizontal extent of camber 18, the maximum vertical extent of chamber 18, the maximum horizontal extent of chamber 19, and desirably also the maximum vertical extent of chamber 19, should for best results all be several, and preferably many, times as great as the height of the gap between edge 20 and conveyor 52. In actual dimensions, it is desirable in most instances that the gap be not greater than about 1½ inches and for best results not over about ¾ of an inch.

In order to prevent excessive heating of conveyor belt 53 by infrared lamps 63, the conveyor belt may be formed of a material which is transparent to, and essentially incapable of absorbing, infrared radiation. For this purpose, the belt may be formed of nylon having these characteristics, so that any infrared rays which pass between particles 56, and do not strike any of them, will be able to pass directly downwardly through the nylon belt without absorption by the belt, and without substantially raising the temperature of the belt.

During freeze drying operation of the apparatus, the product discharge valve 120 is normally in its lowered open position, in which the freeze dried particles may fall downwardly past valve 120 into container 13, with a vacuum being maintained in the container. After the container 13 is substantially full, an operator may close valve 120 by energization of electromagnet 127, and then admit nitrogen into container 13 from a pressurized supply tank 130, past two typically manual valves 131 and 132. The container 13 is then removed, and another similar container mounted in its place, following which a vacuum is drawn in the container by the previously mentioned vacuum pump through valve 132 and another valve 133 (valve 131 having previously been closed). When the vacuum in the new container is as low as that in the main chamber 17, valve 120 may be opened to again place the apparatus in condition for filling freeze dried particles into the container, and to pass into the container any particles which may have accumulated in the meantime within chute 118. Thus, the apparatus is able to function continuously, even during periods in which the container 13 is being emptied or replaced.

The capacity of the different infrared lamps 63, or banks of lamps, to be regulated in temperature individually and differently enables the drying process to be controlled with great precision, so that the maximum rate of drying without burning can be attained at each point along the path of particle movement to thereby minimize the drying time required. It is also noted that the previously mentioned disposition of the individual elongated lamps 63 (and their elongated filaments and reflectors 64) transversely with respect to the direction of movement of conveyor 52 and the drying particles, and desirably through a transverse distance substantially as great as or greater than the width of the conveyor (see FIG. 5), prevents the development of "hot spots" such as would occur if the lamps extended longitudinally of the conveyor. That is, each of the transverse lamps heats all of the particles on the conveyor to exactly the same extent, regardless of whether the particles are in the center of the conveyor, near its edges, or at some intermediate point. A longitudinal lamp, on the other hand, would tend to produce a line of maximum temperature extending along the length of the conveyor and tending to burn the particles positioned along that line.

While a certain specific embodiment of the present invention has been disclosed as typical, the invention is of course not limited to this particular form, but rather is applicable broadly to all such variations as fall within the scope of the appended claims.

I claim:

1. The method that comprises spraying a liquid into a freezing region maintained at sub-atmospheric pressure, freezing tiny sprayed droplets of said liquid into the form of frozen particles, altering the spray pattern of said liquid repeatedly so that said particles or droplets fall along changing paths, supporting said particles after they have been frozen and advancing them slowly along a predetermined path within a sublimation region whose atmosphere communicates with the atmosphere of said freezing region and is maintained at sub-atmospheric pressure, and supplying heat to said particles while in the sublimation region at sub-atmospheric pressure and at a rate subliming moisture from the particles while they remain frozen.

2. Freeze drying apparatus comprising means forming a vacuum chamber, a conveyor within said chamber having an upper surface for receiving and supporting frozen particles and adapted to advance said particles along a predetermined drying path, a plurality of radiant heater elements located near said conveyor at different locations along its length and positioned to radiate heat directly to said particles as they advance along said path, said heater elements being elongated and disposed essentially transversely with respect to the primary direction of advancement of the particles along said path, different ones of said essentially transverse heater elements being at different temperatures.

3. Apparatus comprising a vacuum chamber, means for drying particles in frozen condition within said chamber at sub-atmospheric pressure and delivering the dried particles to a discharge location, an outlet for passing said dried particles at said discharge location into a receptacle at the outside of the chamber, a vacuum lock valve at said outlet actuable between an open position in which it passes particles to said receptacle and a closed position in which it closes off communication between said chamber and said receptacle, means for withdrawing gases from said outlet at the discharge side of said valve while the valve is closed to produce a vacuum at said discharge side before opening the valve, and electromagnetic coil means positioned near said valve and operable to actuate said valve between said positions magnetically.

4. Apparatus as recited in claim 3, in which said valve is actuable downwardly by gravity to said open position and is actuable upwardly to closed position by said coil means.

5. Apparatus as recited in claim 3, in which said valve has an upper surface which tapers upwardly and along which said particles fall downwardly and outwardly in passing the valve.

6. Apparatus as recited in claim 3, in which said outlet includes a downwardly extending conduit, there being means for connecting said receptacle to the lower end of said conduit detachably and in sealed relation, said coil means being disposed about a portion of said conduit formed of non-magnetic material.

7. Apparatus as recited in claim 6, in which said valve has an essentially conical upwardly tapering surface along which said particles fall downwardly, said valve being at least partially formed of magnetic metal and being actuable downwardly by gravity to said open position and actuable upwardly by energization of said coil means, and there being an annular seat against which said valve is engageable upwardly in said closed position, and means for introducing a non-oxidizing gas into said receptacle downwardly beyond said valve.

8. Freeze drying apparatus comprising means forming a vacuum chamber having a freezing region and a sublimation region whose atmospheres are in communication with one another; means for injecting a liquid into said freezing region in spray form and converting the liquid to the form of frozen particles; a conveyor in the chamber operable to advance said frozen particles through said sublimation region and toward a discharge location; means for supplying heat to said particles, as they are advanced by the conveyor through said sublimation region, and at a rate to sublime moisture from the particles while the particles remain frozen; and means for maintaining both of said regions at sub-atmospheric pressure and including a vacuum line connected to said sublimation region and operable to withdraw gases and vapors from the sublimation region without flow of the gases and vapors through said freezing region in leaving the sublimation region, said sublimation region having a generally tubular horizontally extending wall, said vacuum line including a suction outlet pipe connected generally tangentially into the upper side of said generally tubular wall and communicating at its underside with said sublimation region.

9. Freeze drying apparatus comprising a chamber, means for drying a product in said chamber while frozen, means for withdrawing moist gases from said chamber along either of two different paths selectively and for closing off the flow of gases along each of said paths during a period when the gases are being withdrawn along the other path, means along each of said paths for condensing moisture from the withdrawn gases, and means enabling removal of condensed moisture from each of said paths while the gases the being withdrawn along the other path, said condensing means including two moisture removal chambers along said two paths respectively, and refrigerating structures in said moisture removal chambers containing passages within which a refrigerant is circulated and positioned to condense and freeze moisture about said structures, said refrigerating structures being externally tapered downwardly to enable removal downwardly therefrom of a block of ice disposed thereabout, said means enabling removal of the condensed moisture including bottom doors on the moisture removal chambers through which said accumulated blocks of ice can be discharged.

10. Freeze drying apparatus as recited in claim 9, in which said means for withdrawing moist gases along said two paths selectively and for closing off the flow of said gases along said two paths include valve means for closing off said flow along said two paths selectively; said apparatus including means for introducing heated fluid into said structures to facilitate removal of ice therefrom; powered means for actuating said doors; and automatic control means for intermittently converting said valve means, said structures and said doors between a first condition in which said valve means pass moist gases to a first of said moisture removal chambers, whose refrigerating structure is in refrigerating condition and whose door is closed, while preventing flow of gases to the second removal chamber, whose refrigerating structure is being heated and whose door is open; and a second condition in which the conditions of said valve means, and said structures and said doors are reversed.

11. Freeze drying apparatus comprising a chamber, means for drying a product in said chamber while frozen, means for withdrawing moist gases from said chamber along either of two different paths selectively and for closing off the flow of gases along each of said paths during a period when the gases are being withdrawn along the other path, means along each of said paths for condensing moisture from the withdrawn gases, and means enabling removal of condensed moisture from each of said paths while the gases are being withdrawn along the other path, said condensing means including two moisture removal chambers along said two paths respectively, and means for freezing said moisture in the removal chambers, said means enabling removal of the condensed moisture including doors on said removal chambers each of which is openable when the path of moist gases to the associated chamber is closed off and past which accumulated ice is removable.

12. Freeze drying apparatus as recited in claim 11, in which said means enabling removal of the condensed moisture includes automatic means for opening one of said doors while the other remains closed and vice versa.

13. Freeze drying apparatus comprising a chamber, means for drying a product in said chamber while frozen, means for withdrawing moist gases from said chamber, a moisture removal chamber to which said withdrawn moist gases flow, means for condensing the moisture from said gases in said removal chamber, and means for closing off communication between said first mentioned chamber and said moisture removal chamber to enable withdrawal of condensed moisture from the latter chamber while isolated from the first chamber, said condensing means including a structure in said removal chamber through which refrigerant passes and about the outside of which moisture freezes, said removal chamber having a door through which ice from about said structure is removable.

14. Freeze drying apparatus comprising a chamber, means for drying a product in said chamber while frozen, means for withdrawing moist gases from said chamber, a moisture removal chamber to which said withdrawn moist gases flow, means for condensing the moisture from said gases in said removal chamber, and means for closing off communication between said first mentioned chamber and said moisture removal chamber to enable withdrawal of condensed moisture from the latter chamber while isolated from the first chamber, said condensing means including a structure in said removal chamber through which refrigerant passes and about the outside of which moisture freezes, said structure being externally tapered to facilitate removal of a block of ice from thereabout.

15. Freeze drying apparatus as recited in claim 14, in which said structure is tapered downwardly to enable removal of a block of ice downwardly therefrom, said removal chamber having a bottom door through which said ice is removable.

16. Freeze drying apparatus as recited in claim 14, in which said structure is tapered downwardly to enable removal of a block of ice downwardly therefrom, said removal chamber having a bottom door through which said ice is removable, there being automatic means for opening said door.

17. Freeze drying apparatus as recited in claim 14, in which said structure is tapered downwardly to enable removal of a block of ice downwardly therefrom, said removal chamber having a bottom door through which said ice is removable, said means for closing off communication between said first mentioned chamber and said moisture removal chamber including valve means therebetween, there being means for passing a relatively warm fluid into said structure to facilitate removal of the ice, and automatic means for actuating said fluid passing means and said door and said valve means in a predetermined timed relation during an ice removal cycle.

18. The method that comprises subliming moisture from a product within a chamber while the product is frozen and maintained at sub-atmospheric pressure, withdrawing moist gases from said chamber to a second chamber, condensing moisture from said gases in said second chamber by freezing the moisture about a refrigerating structure, removing the condensed moisture from said second chamber by sliding an accumulated block of ice while still in frozen form from about said structure, and closing off the gas flow path from said first chamber to said second chamber while the condensed moisture is being removed from said second chamber.

19. Freeze drying apparatus comprising means defining a freezing region and a sublimation region; means for maintaining said regions at sub-atmospheric pressure; means for injecting a liquid into said sub-atmospheric pressure of the freezing region in spray form and in a relation converting tiny sprayed droplets of the liquid into the form of frozen particles, said injecting means operating to spray liquid into said freezing region in a pattern which changes repeatedly and automatically to avoid development of unwanted temperature differentials in the freezing region, a conveyor operable to advance said frozen particles through said sublimation region and toward a discharge location; and means for supplying heat to said particles, as they are advanced by the conveyor through said sublimation region, and at a rate to sublime moisture from the particles while the particles remain frozen.

20. Freeze drying apparatus comprising a chamber, means for drying a product in said chamber while frozen, means for withdrawing moist gases from said chamber along either of two different paths selectively and for closing off the flow of gases along each of said paths during a period when the gases are being withdrawn along the other path, two condensing chambers along said two paths respectively within which moisture from the withdrawn gases is condensed, means for freezing said moisture in said condensing chambers into blocks of ice, and outlet means constructed to enable removal of said blocks of ice from said condensing chambers while said blocks remain frozen.

21. Freeze drying apparatus as recited in claim 20, including automatic control means for actuating said gas withdrawing means intermittently between two different conditions in which they pass said gases along said two different paths respectively.

22. Freeze drying apparatus as recited in claim 20, including means for applying heat to each of said condensing chambers while said gases are not passing therethrough to enable removal of the accumulated moisture from the chambers.

23. Freeze drying apparatus as recited in claim 20, in which said means for withdrawing the gases along said two paths and for closing off said flow along each path include vacuum pump means for withdrawing the gases, first and second valves along each of said paths located upstream and downstream respectively of the associated condensing chamber, and automatic control means for actuating said valves to withdraw gases along said two paths alternately and operable on each cycle to open said second valve at the downstream side of each condensing chamber before opening said first valve at the upstream side of the same chamber.

24. Freeze drying apparatus comprising a chamber, means for drying a product in said chamber while frozen, means for withdrawing moist gases from said chamber, a moisture condensing chamber to which said withdrawn moist gases flow, means for freezing the moisture from said gases into a block of ice in said condensing chamber, outlet means enabling removal of said block of ice from said condensing chamber while said block remains frozen, and means for closing off communication between said first mentioned chamber and said condensing chamber during said removal of said ice block.

25. Freeze drying apparatus as recited in claim 24, in which said freezing means include a structure in said condensing chamber through which refrigerant passes and about the outside of which said block of ice freezes and from which said block is slidably withdrawable.

26. Freeze drying apparatus as recited in claim 24, in which said freezing means include a structure in said condensing chamber through which refrigerant passes and about the outside of which moisture freezes, there being means for passing a relatively warm fluid into said structure to facilitate removal of the ice.

27. The method that comprises subliming moisture from a product within a chamber while the product is frozen and maintained at sub-atmospheric pressure, withdrawing moist gases from said chamber alternately along two different paths, freezing moisture from said gases into blocks of ice alternately at two moisture removal locations along said two paths respectively, and removing said blocks of ice while still frozen from each of said locations during an interval when the gases are being withdrawn past the other location only.

28. The method that comprises subliming moisture from a product within a chamber while the product is frozen and maintained at sub-atmospheric pressure, withdrawing moist gases from said chamber to a second chamber, freezing moisture from said gases into a block of ice in said second chamber, removing said block of ice from said second chamber while still frozen, and closing off the gas flow path from said first chamber to said second chamber while the ice block is being removed from said second chamber.

29. Freeze drying apparatus comprising means forming a vacuum chamber having a freezing region and a sublimation region both at sub-atmospheric pressure and in communication with one another; sprayer means for injecting a liquid into the sub-atmospheric pressure of the freezing region in spray form and in a relation converting tiny sprayed droplets of the liquid into the form of frozen particles; a conveyor in the chamber having a portion at the bottom of said freezing region onto which said sprayed particles fall after they have been frozen to said solid form and while they are still subjected to said sub-atmospheric pressure; there being an open and unobstructed path between said sprayer means and said portion of the conveyor along which substantially all of said sprayed particles can fall without contacting or being deflected by any intermediate surface between the sprayer means and conveyor; means for refrigerating said freezing region without contacting said particles; and conveyor being operable to advance said frozen particles from the bottom of said freezing region into said sublimation region and then along said sublimation region toward a discharge location; means for supplying heat to said particles, as they are advanced by the conveyor through said sublimation region, and at a rate to sublime moisture from the particles while the particles remain frozen; a structure at the bottom of said freezing region defining a restricted gap above the conveyor through which said particles can advance on the conveyor from said freezing region to the sublimation region; and means for maintaining said regions at sub-atmospheric pressure and including a vacuum line connected to said sublimation region to withdraw gases and vapors from the sublimation region without flow of the gases through the freezing region in leaving the sublimation region.

30. Freeze drying apparatus as recited in claim 29, in which said sprayer means are operable to spray liquid into said freezing region in a pulsating spray pattern.

31. Freeze drying apparatus as recited in claim 29, in which said means for maintaining said regions at sub-atmospheric pressure include a vacuum pump taking suction through said vacuum line and delivering vapors from the chamber to a moisture removal chamber, means for condensing said vapors in said removal chamber, and means for closing off communication between said first mentioned chamber and said moisture removal chamber.

32. Freeze drying apparatus as recited in claim 29, in which said chamber has a generally horizontal portion containing said sublimation region and said conveyor, and an upwardly projecting portion containing said freezing region and having a side wall, said refrigerating means being positioned and constructed to cool said side wall.

33. Freeze drying apparatus as recited in claim 29, in which said means for maintaining said regions at sub-atmospheric pressure include means defining two paths along which said moist gases are withdrawn from said sublimation region, means along each of said paths for condensing moisture from the gases, and valve means for closing off the flow of moist gases along either of said paths selectively to enable removal of condensed moisture from one path while gases are being withdrawn from the chamber along the other path.

34. Freeze drying apparatus as recited in claim 29, in which said chamber has a generally horizontal portion containing said sublimation region and said conveyor, and an upwardly projecting higher portion containing said freezing region and into which said liquid is sprayed downwardly at a level above said generally horizontal portion, said structure including a shield extending downwardly at the bottom of said higher portion of said chamber and into said generally horizontal portion to a lower edge of the shield which is received in closely spaced relation to the upper surface of said conveyor to provide said restricted gap through which said particles may pass on the conveyor from said freezing region to said sublimation region.

35. Freeze drying apparatus as recited in claim 34, in which said sprayer means spray the liquid in a downwardly flaring pattern, said upwardly projecting portion of the chamber having a side wall structure which flares downwardly generally conically and essentially in correspondence with said spray pattern but with the spray pattern being spaced from the side wall structure to avoid contact therewith, said refrigerating means including means for directing a refrigerant liquid along the outside of said wall structure in contact therewith in a relation withdrawing heat from the freezing region through the wall structure.

36. Freeze drying apparatus as recited in claim 29, in which said sprayer means spray said liquid generally downwardly into said freezing region in a downwardly flaring pattern, said chamber having a side wall about said freezing region which flares downwardly in essential correspondence with but spaced from said spray pattern.

37. Freeze drying apparatus as recited in claim 29, in which said vacuum line withdraws gases and vapors from essentially the top of said sublimation region.

38. Freeze drying apparatus as recited in claim 29, in which said vacuum line withdraws vapors from said sublimation chamber at a location near said shield.

39. The method that comprises spraying a liquid into a freezing region above a portion of a conveyor, maintaining said freezing region at sub-atmospheric pressure, freezing tiny sprayed droplets of said liquid into the form of frozen particles while at said sub-atmospheric pressure and before the droplets can fall onto any surface, passing substantially all of said frozen particles downwardly onto said conveyor without permitting them to first contact any other surface, advancing said particles along said conveyor past a structure which essentially separates said freezing region from said sublimation region and through a restricted gap between said regions, supplying heat to said particles while in the sublimation region at sub-atmospheric pressure and at a rate subliming moisture from the particles while they remain frozen, and withdrawing gases and vapors from said sublimation region without flow of the gases and vapors thorugh said freezing region in leaving the sublimation region.

40. Freeze drying apparatus comprising means forming a vacuum chamber having a freezing region and a sublimation region whose atmospheres are in communication with one another; means for maintaining both of said communicating regions at sub-atmospheric pressure; means for spraying a liquid downwardly into an upper portion of said freezing region in a downwardly flaring spray pattern and in a relation converting tiny sprayed droplets of the liquid into the form of frozen particles before the droplets can contact and be supported by any surface in the chamber; said chamber having a side wall about said freezing region which flares downwardly generally in correspondence with said flaring spray pattern but spaced from the periphery of said spray pattern to avoid contact of the droplets or particles with said walls; means for refrigerating said downwardly flaring wall; a conveyor in the chamber positioned to receive said particles after they have been frozen to said solid form and while they are still subjected to said sub-atmospheric pressure; said conveyor being operable to advance said frozen particles through said sublimation region and toward a discharge location; and means for supplying heat to said particles, as they are advanced by the conveyor through said sublimation region, and at a rate to sublime moisture from the particles while the particles remain frozen.

41. The method as recited in claim 1, in which said spray pattern flares progressively and is altered repeatedly by pulsating the spray pressure to repeatedly change the spray width.

42. Freeze drying apparatus as recited in claim 19, in which said injecting means operate to spray liquid into said freezing region in a pattern which flares progressively and which pulsates in a relation repeatedly changing the spray width.

43. Freeze drying apparatus as recited in claim 19, in which said injecting means include a spray nozzle constructed to spray said liquid into said freezing region in a pattern which flares progressively in leaving the nozzle, and a pump operable to force said liquid through said nozzle at a pressure which pulsates to repeatedly change the width of said flaring pattern.

References Cited

UNITED STATES PATENTS

| | | | |
|---|---|---|---|
| 3,362,835 | 1/1968 | Thuse | 99—199 |
| 3,431,655 | 3/1969 | Groves | 34—5 |
| 2,471,035 | 5/1949 | Hurd | 34—5 |
| 2,533,125 | 12/1950 | Levinson | 34—5 |
| 2,751,687 | 6/1956 | Cotton | 34—5 |
| 2,813,350 | 11/1957 | Berger | 34—5 |
| 3,243,892 | 4/1966 | Ullrich | 34—92 |
| 3,264,747 | 8/1966 | Fuentevilla | 34—5 |
| 3,271,874 | 9/1966 | Oppenheimer | 34—5 |
| 3,319,344 | 5/1967 | Sachsel | 34—92 |
| 3,324,565 | 6/1967 | Smith | 34—92 |
| 3,364,591 | 1/1968 | Eckenbery | 34—92 |
| 3,382,586 | 5/1968 | Lorentzen | 34—5 |

WILLIAM J. WYE, Primary Examiner

U.S. Cl. X.R.

34—92; 62—74